United States Patent Office 2,820,821
Patented Jan. 21, 1958

2,820,821

PROCESS FOR OXIDIZING GLUTARALDEHYDES

Howard R. Guest, Charleston, and Harry A. Stansbury, Jr. and Herman F. Lykins, South Charleston, W. Va., assignors to Union Carbide Corporation, a corporation of New York No Drawing. Application January 5, 1956
Serial No. 557,457

15 Claims. (Cl. 260—530)

This invention relates to oxidation processes, and is a continuation-in-part of our copending U. S. application Serial No. 378,681, now abandoned. It is more particularly concerned with an improvement in processes for making oxidation products from glutaraldehydes, including glutaraldehyde, lower alkyl-substituted glutaraldehydes and halogen substituted glutaraldehydes. It includes also a method of producing glutaric acids of a high degree of purity. As used herein the term glutaric acids includes unsubstituted glutaric acid, lower alkyl and halogen substituted glutaric acids containing a total of up to 7 carbon atoms, and the term glutaraldehydes includes the corresponding unsubstituted and substituted glutaraldehydes.

Glutaric acids and their anhydrides have not heretofore been readily produceable on a commercial scale. The next higher homolog of glutaric acid, adipic acid, has been available commercially and its derivatives have found wide and valuable application in the production of plasticizers, synthetic fibers including nylon, insect repellants and synthetic lubricants, but it does not appear that the utility of derivatives of glutaric acid has been similarly explored. However, we are aware that as plasticizers, polyesters made from glutaric acid and polyhydric alcohols impart excellent low temperature characteristics to resin-plasticizer compositions. For instance, the polyesters made from glutaric acid or glutaric anhydride and 1,5-pentanediol are plasticizers for vinyl-type polymers, and the plasticized resins have many useful properties including unexpectedly and unpredictably superior low temperature performance.

A practicable method for the production of glutaric acid or its anhydride has been long sought for. The first preparation of glutaric acid involved the hydrolysis of trimethylene cyanide (Reboul, comp. rend., (1876) vol. 82; 1197). This method was improved by Marvel and Turley (Organic Synthesis (1925) vol. 5; 69). Perkins (Ber. (1886) vol. 19; 1053–1057), prepared the acid from methylene dimalonic ester, the condensation product of formaldehyde and two moles of malonic ester. The tetra ester was hydrolyzed and decarboxylated to form glutaric acid. This procedure was modified by other workers including Knoevenagel (Ber. (1894) vol. 27; 2346), Gault (Bull. Soc. Chem. (1912) vol. 11; 380–382), Otterbach (Organic Syntheses, (1930) vol. 10; 58–59). A similar reaction recently developed involved the condensation of acrylonitrile with malonic esters followed by hydrolysis and subsequent decarboxylation (Hesse and Bucking, Ann. (1949) vol. 563, 31–37) (Mikeska, Patent 2,461,-336).

Glutaric acid was made by Markownikow (Ber., (1900) vol. 33; 1909) by the oxidation of methylcyclopentane with nitric acid. It was made also by Fleming (Patent No. 2,452,741) and Cavanaugh and Nagle (Patent No. 2,343,534) by the oxidation of cyclopentane and cyclohexane with nitric acid. Herr (Petroleum (1910) vol. 5; 692) reported that naphthenes from petroleum were oxidized with nitric acid to produce glutaric acid. Nelles, in Patent No. 2,168,844 disclosed that glutaric acid was produced by oxidizing methyl cyclohexane in the vapor phase over a vanadium oxide catalyst. Kerosene, decalin and butyl decalin all yielded glutaric acid upon oxidation with nitric acid according to Zal'kind and Khuskivadge (J. Applied Chem. U. S. S. R. (1941), vol. 14, 405–409; translated in Foreign Petroleum Tech. (1941) vol. 9; 444–452). Cyclopentene was converted by Harries and Frank (Ber. (1908) vol. 41; 1701–1711) to an ozonide which was decomposed to glutaric acid.

Cyclopentanone was oxidized with nitric acid to form glutaric acid (Hentzchel and Wislicenus, Ann. (1893) vol. 275; 315; McAllister Patent No. 2,286,559). Cyclopentanone was oxidized also with oxygen or air (Fleming and Speer Patent No. 2,005,183) to make glutaric acid. McAllister (Patent No. 2,193,562) described a process for the production of glutaric acid by the oxidation of cyclopentanol with nitric acid. Crude hydrogenated phenols and cresols were oxidized by Claasen (Fr. Patent No. 32,991) to a mixture of acids including glutaric acid.

A somewhat unusual preparation was the fusion of tetrahydrofurfuryl alcohol with caustic soda to form the sodium salt of glutaric acid (Park and Alsfield, Ger. Patent 725,741). Pummerer and Schonamsgruber (Ber. (1938) vol. 72B; 1842) reported that glutaric acid was obtained in 80 percent yield when 1,5-pentanediol was oxidized with alkaline permanganate. Glutaric acid was obtained also when 5-hydroxypentanal (5-hydroxy valeraldehyde) was oxidized with nitric acid (Bremmer, et al. Patent No. 2,389,950; English and Dayan, Organic Syntheses (1950) vol. 30; 48–50). Glutaric acid was produced also upon the oxidation of 2-hydroxy-adipaldehyde with oxygen in the presence of a cobalt acetate-zinc chloride catalyst (U. S. O. P. B. 73,715, frames 6289–6290 (1942); U. S. 2,513,766).

Glutaric anhydride was prepared for the first time when Markownikoff (Ber. (1877) vol. 10; 1103) heated the silver salt of glutaric acid with acetyl chloride in ether solution. The anhydride was formed also by Markownikoff by refluxing glutaric acid at a temperature of 190° C. and at an absolute pressure of 10 millimeters of mercury for a period of two to three hours. Glutaric anhydride was also formed by Voerman (Recueil des Travaux de Pays Bas, (1904) vol. 23; 267) by the action of phosphorus pentachloride on the acid and by Mol (Rec. des trav. chem. de Pays Bas (1907) vol. 26; 381) by the action of acetyl chloride on the acid.

None of these procedures have been found suitable for commercial operation for a variety of reasons, including among others, low yield, costly reactants, corrosive reactants requiring expensive equipment and the like.

In view of the availability of glutaraldehyde as a low-cost starting material, a practicable process for the production of glutaric acids based on the oxidation of glutaraldehydes by means of molecular oxygen would be of considerable value. According to our studies, the oxidation of glutaraldehyde to glutaric acid by means of molecular oxygen apparently proceeds stepwise through the formation of 4-formylbutyric acid as represented by the following scheme.

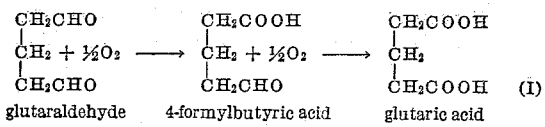

In order for the production of glutaric acid to be practicable, however, it is highly desirable, if not essential, still according to our studies, for the oxidation to be carried to completion, with all of the glutaraldehyde starting material being oxidized to glutaric acid because of the problems that otherwise are encountered in the separation of the intermediate oxidation product, 2-formylbutyric acid, from the glutaric acid. As far as we are aware no feasible method for separation is available, and even if it were possible efficiently to separate the 4-formylbutyric acid, the recovered 4-formylbutyric acid must be recycled to the oxidizer with consequent disadvantage.

The present improvement employs our discovery that by carrying out the oxidation of glutaraldehydes in aqueous solution, the difficulties heretofore encountered in attempts to prepare glutaric acids therefrom are largely minimized if not completely eliminated. It is an essential feature of our process that the oxidation of glutaraldehyde shall be carried out in an aqueous solution in which the glutaraldehyde content is not less than 10 parts nor more than 50 parts per 100 parts of the combined weight of the water and the glutaraldehyde. At concentrations of more than 50 parts of the dialdehyde, the glutaraldehyde undergoes a change to an insoluble polymeric form even at room temperature, and the oxidation reaction becomes inoperative. At concentrations of less than 10 parts of dialdehyde, on the other hand, the volume of the reaction mixture becomes excessive per pound of product.

According to one embodiment of our improvement, the oxidation of glutaraldehydes, except halogen substituted glutaraldehydes, is carried out with molecular oxygen in the presence of a catalytic metal salt, preferably a salt of cobalt. The molecular oxygen can be introduced into the reaction mixture by known expedients, as for instance, by means of a diffuser. As a source of oxygen, air is preferred over cylinder oxygen, although the latter may be used if desired. Air has the advantage of being less expensive. But we have found that air had additional advantages. In using air it is desirable to employ some pressure to increase the solubility of the oxygen from the air in the reaction medium. A pressure of about 150 pounds per square inch gauge is preferred, as at pressures much above this expensive high-strength vessels might be required. The agitation of the reaction liquid created by blowing in oxygen, particularly when in the form of air, is quite beneficial as it aids in distributing the oxygen properly and also promotes better heat transfer for disposal of the heat of reaction.

Metal salts suitable as catalysts include water-soluble salts of cobalt, copper, manganese or vanadium, either separately or in combination with one another or with other metallic salts. Our preferred catalyst is cobalt. Both organic and inorganic cobalt compounds have been found useful and are equally effective on the basis of their cobalt content. It appears from our studies that the active form of the cobalt catalyst may be the salt of a peroxidized acid, such as peroxidized glutaric acid. Accordingly the addition of cobalt in any form which is readily converted to such a salt is useful and desirable. Such salts include cobalt acetate, chloride, carbonate, sulfate, nitrate, phosphate, linoleate, naphthanate, and the like.

The amount of catalyst that can be employed is not narrowly critical. In general it is unnecessary to use more than 5 parts by weight of the water soluble salt per 100 parts by weight of the glutaraldehyde and water. Larger amounts of catalyst can also be employed without detrimental effect, but a commensurate improvement in the oxidation rate by reason of such larger amount has not been observed. An amount of catalyst which is at least 0.001 part per 100 parts by weight of glutaraldehyde and water should be employed in order that the reaction rate is not too slow. Our preferred catalyst composition is between 0.10 and 2.0 parts of a water soluble salt of cobalt per 100 parts of aqueous solution of the glutaraldehyde.

The oxidation proceeds best in the temperature range from about 10° C. to 110° C. At temperatures above 110° C. tarry condensation products are formed which lower the efficiency of the oxidation whereas at temperatures below 10° C. the oxidation rate is too slow.

In our studies of the oxidation of glutaraldehyde with molecular oxygen we have found that an induction period, a finite period of time, must ordinarily elapse, under most conditions, before the oxidation reaction proceeds at an appreciable rate. While the induction period is of little consequence with continuous operation, it presents a definite problem when repeated batch operations are employed, this latter procedure being common in the commercial oxidation of a glutaraldehyde. In the course of our studies we have discovered several means by which this induction period may be eliminated or at least kept to a negligible minimum. Temperature is important in this regard and increasing the temperature of the reaction mixture for a short time until oxidation commences will greatly reduce the induction period. The increased temperature, not above 150° C., should be employed only until the oxidation is under way. As stated above, the temperature during the oxidation process, once it has begun, should not exceed 110° C. because of the tendency to form tarry condensation products.

We have further discovered that the induction period before oxidation commences may be greatly reduced or substantially eliminated by the addition to the reaction mixture of relatively minor amounts of certain compounds which act as promoters for the oxidation reaction. Such promoters include acetaldehyde, propionaldehyde, acetic acid and glutaric acid. The particular promoter to be used will depend on the usual factors of cost and availability, as well as upon the manner in which the oxidation is being conducted.

When isolated batch runs of the process are made, with appreciable lapses of time between runs, the induction period can be greatly reduced by charging into the reaction mixture as an oxidizing promoter either acetaldehyde or acetic acid or a mixture of both, in an amount of from 10 to 200 percent by weight of the aqueous glutaraldehyde charge. Without wishing to be bound by any particular theory as to the mechanism of the reaction, the acetaldehyde can be regarded as being itself converted to acetaldehyde monoperacetate or to peracetic acid or to both and finally to acetic acid under the conditions employed. As is known, the primary oxidation product of acetaldehyde can be, under favorable conditions, acetaldehyde monoperacetate, which tends to break down into acetaldehyde and peracetic acid. Peracetic acid, as an intermediate, is unstable in the presence of water, and readily yields up oxygen for the oxidation of glutaraldehyde. The overall result of the oxidation can be represented by a series of equations as follows:

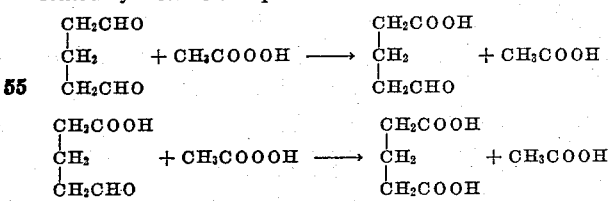

Other lower saturated aldehydes such as propionaldehyde may also be employed.

Peracetic acid also appears to be the oxidizing agent when acetic acid is the promoter used to reduce the induction period. Surprising, even in the presence of a cobalt catalyst, the acetic acid is to some extent oxidized to peracetic acid by the molecular oxygen. Apparently a peroxidized system can in some manner be formed incorporating the cobalt catalyst. The peracetic acid oxidizes the glutaraldehyde and itself reverts to acetic acid.

Commercial production of glutaric acid frequently involves repetitive batch runs of the oxidation reaction. In such cases glutaric acid can be used as a promoter for the reaction for we have discovered that glutaric acid appears to be entirely equivalent to acetic acid as an oxidation promoter in its beneficial effect on the system. While the mechanism is not fully understood, the glutaric acid apparently undergoes oxidation in a manner similar to the acetic acid so as to form a peroxidized compound. Thus in repetitive batch runs a small amount of the crude reaction product from a previous run may be added to initiate the new reaction. We have found that this crude reaction product is even more effective than the glutaric acid it supplies, having apparent properties of its own to aid in the formation of the necessary peroxidized system. With the addition of crude reaction product from a previous run in the amount of from 3 to 30 percent by weight of the charge there is virtually no induction period.

In another embodiment of our invention, the oxidation of glutaraldehydes in aqueous solution can be carried out using hydrogen peroxide as the oxidizing agent. The reaction mixture of a glutaraldehyde and hydrogen peroxide in aqueous solution is heated to its reaction temperature, as, for instance, by refluxing the solution under atmospheric pressure. Pressures somewhat above or below atmospheric can also be employed, if desired, with correspondingly higher and lower refluxing temperatures. Instead of hydrogen peroxide, such oxidizing agents as peracetic acid, perpropionic acid and the like can be used if desired. With these oxidizing agents as with air, it is desirable to employ a cobalt catalyst of the type described heretofore. It is also desirable to use the same temperature range as with air, from 10° to 110° C.

When peracetic acid is employed as the oxidizing agent it is also possible to oxidize aqueous solutions of halogen-substituted glutaraldehydes to the corresponding acids. The acid may then be converted to the anhydride by reaction with acetic anhydride. In oxidizing the halogen-substituted glutaraldehydes with peracetic acid a catalyst is not essential but may be employed if desired. We have not found molecular oxygen to be a suitable oxidizing agent for converting the halogen-substituted glutaraldehydes to the corresponding acids.

The first described embodiment with molecular oxygen (i. e. air) as the oxidizing agent is preferred, however, except for the oxidation of the halogen-substituted glutaraldehydes. Because of the relatively higher cost of oxidizing agents other than molecular oxygen, however, they will probably be found more practicable for small scale production.

Inasmuch as cobalt compounds are relatively expensive and available only in limited supply, it is highly desirable to recover such materials or reuse them directly as catalysts if possible. At the finish of an oxidation reaction, and after the crude product has been volatilized from the tars, the cobalt catalyst will then be found among the residues. It is possible to return these residues as such to another oxidation run so that the contained cobalt can again function as a catalyst, as shown in Example XIV. Repeated operations in this manner, however, would soon gather an undesirable amount of accumulated residues. Hence it becomes desirable, after a certain number of runs in this manner, to extract the cobalt salts as water-soluble constituents from the residues while discarding the tars as oil-soluble constituents. The recovery is effected by dissolving the tarry catalyst-containing residue in a boiling acid, preferably acetic acid. This solution is mixed with water and ethyl acetate. The water layer is then separated and extracted with more ethyl acetate. The cobalt catalyst is found in the final water layer as cobalt acetate tetrahydrate. This catalyst recovery method is illustrated in Example XII.

The glutaric acid produced by the oxidation of glutaraldehyde can be purified, if desired, by conversion to the more readily distilled glutaric anhydride. Compared to glutaric acid, glutaric anhydride is both lower melting, with a melting point of 58° C. compared to 97° C. for the acid, and lower boiling, with a boiling point of 130° C. compared to 175° C. at 5 mm. for the acid. The oxidation product can be more easily and effectively purified in the form of the anhydride than as the acid. For most applications the glutaric is even more acceptable in the form of the anhydride than as the acid. As the anhydride, for instance, the glutaric is much more reactive toward alcohols. Therefore from the view of ease of purification of oxidation product as well as, in many cases, of utility of the final product, it is often desirable to convert the glutaric acid in the oxidation product to glutaric anhydride.

Such conversion may be in more than one way. For instance, the glutaric acid product, after it has been freed of water by distillation, may be admixed with at least an equivalent amount of acetic anhydride and heated to its reaction temperature. By the same reaction, an amount of acetic anhydride equivalent to the glutaric acid is converted to acetic acid. The reaction is reversible and the concentration of the glutaric anhydride can be increased by conventional expedients employed in such instances, as for instance by removal of one of the products, which in this case is acetic acid.

Instead of acetic anhydride, other low boiling anhydrides of lower carboxylic acids are suitable. For instance, the anhydrides of the lower members of the fatty acid series, propionic and butyric anhydrides, can be used.

The temperature at which the reaction proceeds is not narrowly critical. At temperatures of 50° C. and below, however, the reaction rate is so slow that the process is not feasible, even in the presence of a mineral acid catalyst. Also, the by-product acetic acid distilled from the reaction mixture is difficult to condense at the reduced pressure required to maintain reflux in the reaction vessel (acetic acid distills at a temperature of 18° C. at a pressure of 10 millimeters of mercury, and freezes at 16.6° C.). On the other hand, at temperatures above 250° C. there is a tendency for tarry by-products to form as a result of decomposition of glutaric acid.

The ratio of acetic anhydride to glutaric acid in the reaction zone can be varied from 1 to 10 moles of acetic anhydride per mole of the acid. Below a ratio of 1 there is not enough of the anhydride to effect cyclization of all of the glutaric acid. Ratios higher than 10 moles of the anhydride increases the volume of the reaction mixture too much without a sufficient increase in the reaction rate.

The reaction can be carried out conveniently in a reactor provided with a reflux condenser and fractionating column maintained at a temperature which will permit the vapors of the acetic acid to pass through while condensing and returning to the reaction vessel the glutaric acid and acetic and glutaric anhydrides. Upon the completion of the reaction, the glutaric anhydride can be separated and purified by distillation.

Our preferred method of converting the glutaric acid oxidation product to the anhydride, however, is a thermal conversion. In this method the oxidation product is first stripped of water by distillation. It is then volatilized without fractionation to concentrate the tars and catalyst in the non-volatile residue. The distillate thus obtained contains glutaric acid and glutaric anhydride roughly in the ratio of 3 to 1 along with certain volatile impurities. The thermal conversion of the glutaric acid in this distillate to the anhydride is best accomplished by heating the distillate in the kettle of a fractional distillation system under reduced pressure. The kettle temperature is maintained between 160° C. and 290° C., with a temperature of about 240° C. preferred.

To cause the conversion reaction to proceed at a reasonable rate, the anhydride must be removed promptly from the system along with the water formed during the conversion. The reaction mixture is refluxed in an efficient fractionating column to keep nearly all of the glutaric acid in the kettle region. The anhydride distillate is liquified by a hot partial condenser at a temperature such that the anhydride does not crystallize and yet substantially all of the product condenses. This temperature should be between 60° and 140° C., with about 110° C. preferred. The water formed in the reaction does not have the opportunity to react with the anhydride since it fails to condense at the temperatures prevailing in the partial condenser designed to liquify the anhydride. It is important that merely heating the glutaric acid to elevated temperatures and returning the reflux to the column is not a practical scheme for making the anhydride. It is essential that the product be removed from the reaction zone in order for the reaction to proceed.

As has been pointed out above, for many applications the glutaric acid is preferably used as the anhydride. In other applications, however, a glutaric acid is preferred, and this may be made readily from the purified anhydride. To regenerate the acid, the purified glutaric anhydride is hydrolyzed, using from about one to two mols of water per mol of anhydride. With an amount of water which is less than 1.00 mole per mole of anhydride, it is impossible to obtain complete conversion while the use of more than 2 moles of water provided no worthwhile increase in the reaction rate. Because the excess of water must be removed from the acid, it is desirable to use no more water than is required to obtain a complete and rapid reaction.

The most desirable temperature range for the reaction is from about 50° C. to about 200° C., with about 140° C. being preferred. The hydrolysis will proceed also at a temperature as low as 0° C. but at a slow although useable rate. It is desirable, however, to complete the hydrolysis at a temperature of 97° C. or higher, which is the melting point of the acid. For best results, the final temperature should not exceed 200° C. because of the instability of the glutaric acid. Excess water is removed best by evaporation from the molten acid but other expedients may also be employed, as for instance drying of the solid acid with a drying agent or by azeotropic distillation with an inert solvent such as benzene, toluene and the like. Benzene and toluene can also be used for crystallization of the acid.

Our invention is primarily directed to making the oxidation products of unsubstituted glutaraldehyde and the invention has been described and illustrated above principally in terms of glutaraldehyde and its oxidation products. The process of the invention and hence the procedures outlined above are also useful for oxidizing lower alkyl and halogen substituted glutaraldehydes to the corresponding dicarboxylic acids, including those substituted dialdehydes containing up to 7 carbon atoms. Such dialdehydes include 3-methylglutaraldehyde, 2-chloroglutaraldehyde, 2-ethylglutaraldehyde, 2-methylglutaraldehyde, 2-bromoglutaraldehyde and the like.

The following examples are illustrative of the invention.

Example I

A charge of 1552 grams of 35.2 percent aqueous glutaraldehyde (5.46 mols), 478 grams of acetic acid and 10 grams of cobalt acetate tetrahydrate was stirred with a high speed agitator while air was fed through a diffuser. After a reaction period of 15.5 hours at a temperature of 40° C. and 4.0 hours at a temperature of 60° C., the oxidation had ceased. The solution was distilled under reduced pressure to isolate the glutaric acid-anhydride mixture in 80 percent yield and efficiency.

Example II

A charge of 505 grams of 34.7 percent aqueous glutaraldehyde (1.75 mols), 142 grams of acetic acid and 3.3 grams of cobalt carbonate was agitated with a high speed stirrer while oxygen was fed through a diffuser. After a reaction period of 2.5 hours at a temperature of 40° C. and 1.5 hours at a temperature of 70° C. the oxidation had ceased. The solution was fractionated under reduced pressure to obtain the glutaric acid-anhydride mixture in 80 percent yield and efficiency.

Example III

A charge of 505 grams of 34.7 percent aqueous glutaraldehyde (1.75 mols), 142 grams of acetic acid and 3.3 grams of cobalt chloride hexahydrate was stirred with a high speed stirrer while gaseous oxygen was fed through a diffuser. Since after 1 hour at a temperature of 40° C. it was apparent that the oxidation was very slow, 3.3 grams more of cobalt chloride hexahydrate was added. After another hour at a temperature of 40° C. the reaction temperature was increased to a temperature of 50° C. The oxidation proceeded at a temperature of 50° C. for 2.5 hours and at a temperature of 70° C. for 1 hour. The crude product was distilled under reduced pressure to isolate the glutaric acid-anhydride mixture in 73 percent yield and efficiency.

Example IV

A mixture of 2547 grams of 34.4 percent glutaraldehyde aqueous solution, 631 grams acetic acid and 16 grams of cobaltous acetate tetrahydrate was charged to a cylindrical stainless steel reactor. This vessel was 62 inches long and 4 inches in diameter. The temperature was controlled by means of tempered water circulating through a jacket surrounding the lower half of the tube. Air, under pressure, was sparged into the reaction mixture through a diffuser in the bottom of the reactor. This served to supply agitation to the solution as the oxidation took place. The temperature was measured by means of a thermocouple in a thermowell extending into the reactor. The pressure was held constant by means of a control valve on the vapor outlet line.

The solution was heated to a temperature of 40° C., and while that temperature was maintained air was admitted to the reactor at the rate of 360 liters per hour while the pressure on the system was held constant at 150 pounds per square inch gauge. The reaction continued under these conditions for 3½ hours. During a substantial part of this time, the exit gas contained an average of 1.4 percent carbon dioxide and 10.1 percent oxygen. At the end of the period, however, the carbon dioxide in the exit gas was 0.6 percent and the oxygen 19.1 percent. At this point the temperature was raised to 90° C., while the air flow was maintained at the rate of 360 liters per hour for 1½ hours to make sure that the reaction was complete.

The crude product was discharged and was found to contain 1.54 percent of unreacted glutaraldehyde. Upon distillation, the glutaric acid-anhydride mixture was obtained in a yield of 80.9 percent from the glutaraldehyde charged. The production rate was 0.52 pound of acid per hour per gallon of reaction mixture charged.

Example V

A charge of 857 grams of 33.4 percent aqueous glutaraldehyde (2.86 mols), 238 grams of a distilled glutaric acid-anhydride mixture (74.4 percent acid and 19.3 percent anhydride, 1.74 mols total) and 5.5 grams of cobalt acetate tetrahydrate was stirred with a high-speed agitator while oxygen was fed through a diffuser. After a reaction period of 10.5 hours at a temperature of 40° C. and 5.5 hours at a temperature of 60° C., the oxidation was complete. The solution was fractionated under reduced pressure to isolate the glutaric acid-anhydride mixture in 85 percent yield and efficiency based on the glutaraldehyde charged.

Example VI

A mixture of 49.96 grams (0.5 mols) of glutaraldehyde in aqueous solution (27.3 percent) and 100 grams of aqueous hydrogen peroxide (34 percent conc.; 1 mol) was heated at its boiling point for a period of six hours in a kettle provided with a reflux. The solution which was colorless was stripped of most of its water under reduced pressure. The remainder of the water was then removed by adding to the residue thus obtained a mixture of one part of acetic acid and two parts of dibutyl ether and distilling to a head temperature of 116° C. Crystals of glutaric acid separated upon cooling the residue. There was obtained 36 grams of pure glutaric acid corresponding to a yield of 55 percent.

Example VII

A mixture of 3490 grams of 35.0 percent aqueous glutaraldehyde (12.2 mols), 1000 grams of acetic acid and 23 grams of cobalt acetate tetrahydrate was stirred with a high speed agitator while oxygen was fed via a diffuser. After a reaction period of 14 hours at a temperature of 40° C., and 4 hours at a temperature of 85° C., the oxidation had stopped. After the crude product was stripped of water and acetic acid, it was distilled at a reduced pressure of 6 to 14 mm. through an unpacked column fitted with a hot (110° C.) condenser filled with boiling toluene. The product fraction distilled with the kettle temperature increasing gradually from a temperature of 170° C. initially to a temperature of 268° C. finally. The product fraction (1170 grams) was 25.7 percent glutaric anhydride and 69.2 percent glutaric acid by analysis. After credit was taken for transfer losses, the yield and efficiency to this distilled mixture was 80 percent.

Example VIII

A charge of 2996 grams of a mixture containing 71.2 percent glutaric acid and 26.8 percent glutaric anhydride was charged to a still equipped with a 1 inch by 24 inch packed column. The column was connected to a condenser through which ethylene glycol at a temperature of 100° C. was circulated. At this temperature, anhydride and acid was condensed but water vapor formed in the reaction passed through and was collected in an ice-cooled trap.

The material was distilled at a kettle temperature of 242°–249° C. The pressure on the system at the beginning of the distillation was 195 mm. and this was gradually decreased to 70 mm. at the conclusion. The distillation required 11 hours and the following cuts were taken:

| Cut | Wt. | Percent glutaric acid | Percent glutaric anhydride |
|---|---|---|---|
| 1 | 293 | 14.05 | 86.7 |
| 2 | 2,182 | 3.0 | 96.3 |
| 3 | 105 | 4.3 | 94.9 |
| Residue | 52 | | |

Of the total acid charged, 90.3 percent was converted to the anhydride. The over-all recovery of combined acid and anhydride was 99.6 percent of the charged.

Example IX

Molecular oxygen was introduced into a mixture of 137 grams (3.1 mols) of acetaldehyde, 60 grams (1 mol) of acetic acid and 6.5 grams of cobalt acetate tetrahydrate was heated at a temperature of 30° C. to 35° C. while 300.2 grams (3 mols) of glutaraldehyde in aqueous solution (26.4 percent) were added dropwise over a period of 2.2 hours. The oxidation was continued at the same temperature for 44 hours while acetaldehyde was added periodically to maintain the oxidation rate, with a total of 445.0 grams (10.1 mols) of acetaldehyde employed in the reaction. At the end of this period, the crude reaction product was found upon analysis to contain no glutaraldehyde and only 0.15 mole of formylbutyric acid.

After adding 300 grams of acetic acid to keep the kettle temperature as low as possible the reaction product was distilled at atmospheric pressure to the boiling point of acetic acid to remove the water. Acetic anhydride (918 grams; 9 mols) was added to the anhydrous material which was then distilled until the head temperature was 135° C. and the final kettle temperature was 166° C. The residue was fractionated under reduced pressure to obtain 265 grams of glutaric anhydride corresponding to a 78 percent yield and efficiency based on the glutaraldehyde.

Example X

A mixture of 132 grams of discolored glutaric acid (99 percent purity; 10 mol) and 306 grams (3 mols) of acetic anhydride was subjected to distillation. Over a period of three hours the head temperature rose from an initial of 120° C. to 134° C. and the kettle temperature rose from 137° C. to 170° C. The kettle residue was then fractionally distilled under reduced pressure to obtain 106 grams of colorless, glutaric acid anhydride having the following properties: boiling point at an absolute pressure of 2 millimeters of mercury, 117° C.; equivalent weight, 57 (theory, 57); melting point, 58° C. The yield based on the glutaric acid charged was 92 percent.

Example XI

A mixture of 12 grams (0.1 mol) of glutaric anhydride and 4 milliliters (0.2 mol) of water was heated to a temperature of 140° C. for one minute. The product was then cooled to 25° C., with stirring. There was obtained 14 grams of colorless, crystalline glutaric acid having a melting point of 86° C. to 89° C. which was found upon analysis to be free of anhydride. (The melting points for glutaric acid given in literature are 95° C. to 96° C. and 97.5° C.) Upon recrystallization of 12 grams of this hydrolysis product from 240 milliliters of hot benzene there was obtained, as a first crop, 11 grams (92 percent recovery) of crystals melting at 94° C. to 97° C. which analyzed as 99 percent glutaric acid.

Example XII

The tarry, non-volatile residue remaining from the distillation of glutaraldehyde oxidation product contains the cobalt catalyst. This catalyst was recovered for reuse by the following procedure. The tarry residue (46 grams), which contained the equivalent of 2.0 grams, of cobalt acetate tetrahydrate, was dissolved in 90 ml., of boiling acetic acid. The solution was mixed with 270 ml. of water and 360 ml. of ethyl acetate while stirring at 25° C. The water layer was separated and extracted with 100 mol. of ethyl acetate. The final, clear water layer (223 grams) contained 0.78 percent by weight of cobalt acetate tetrahydrate, by analysis for cobalt. After credit was taken for transfer losses, the contained cobalt acetate tetrahydrate represented 93.5 percent of that originally charged as the oxidation catalyst.

Example XIII

A charge of 2547 grams of 35.75 percent glutaraldehyde aqueous solution, 16 grams of cobaltous acetate tetrahydrate, and 631 grams of crude product from a previous oxidation was charged to the apparatus described in Example IV. The crude product from the previous run contained 35 percent glutaric acid and 0.5 percent cobaltous acetate tetrahydrate. The mixture was heated to a temperature of 40° C. and air was passed through it at the rate of 360 liters per hour while the pressure was maintained at 150 pounds per square inch gauge. The oxidation began immediately without any induction period and continued at a satisfactory rate for 4½ hours at a temperature of 40° C. At that point analysis of the effluent gas indicated that the reaction had ceased at that temperature. The temperature was then raised to a temperature of 90° C. for 1½ hours while the air flow was maintained at the same rate.

The solution was discharged from the reactor and distilled to isolate the glutaric acid-anhydride mixture. After allowance was made for the glutaric acid in the original charge to the reaction, the observed yield and efficiency were 80.6 percent based on the quantity of glutaraldehyde charged.

Example XIV

To the apparatus described in Example IV a mixture of 2547 grams of 34.7 percent glutaraldehyde aqueous solution, 631 grams acetic acid and 16 grams of cobaltous acetate tetrahydrate was charged. The oxidation was conducted at a temperature of 40° C. and 150 pounds per square inch gauge pressure with air as the oxidant. The product was distilled to obtain the glutaric acid-anhydride mixture in a yield and efficiency of 76.4 percent. The residue from the distillation, which contained the cobalt catalyst as well as tars formed in the reaction and distillation, weighed 89 grams.

This residue was combined with 2547 grams of 33.55 percent glutaraldehyde aqueous solution, and 631 grams of acetic acid and charged to the oxidation apparatus. The material was oxidized at a temperature of 40° C. and 150 pounds per square inch gauge using an air flow of 350 liters per hour. The reaction was run in this manner for 3¾ hours, with an additional hour of operation at a temperature of 90° C. to complete the oxidation. The material was discharged and distilled to isolate the glutaric acid-anhydride mixture in a yield and efficiency of 80.6 percent.

*Example XV*

An aqueous solution containing 42.6 percent 3-methylglutaraldehyde was prepared by the hydrolysis of the crotonaldehyde-vinyl ether adduct, 2-ethoxy-3,4-dihydro-4-methyl-1,2-pyran. A charge of 670 grams of the aqueous dialdehyde solution (2.5 mols), 275 grams of acetic acid and 5 grams of cobalt acetate tetrahydrate was agitated with a high-speed stirrer while gaseous oxygen was fed through a diffuser. After a reaction period of 3 hours at 45° C. and 1.5 hours at 70° C., the oxidation had stopped. The crude solution was fractionated under reduced pressure to obtain the 3-methylglutaric acid-anhydride mixture which distilled in the range of 165° C. to 205° C. at a reduced pressure of 12 mm. This distilled mixture was analyzed by the morpholine method and by the sodium methylate method to determine that it contained 29.9 percent anhydride and 65.5 percent acid. The yield and efficiency to this distilled fraction was 70 percent.

*Example XVI*

A charge of 1981 grams of 42.6 percent aqueous 3-methylglutaraldehyde (7.4 mols), 818 grams of acetic acid and 14 grams of cobalt acetate tetrahydrate was agitated with a high speed stirrer while air was fed through a diffuser. After a reaction period of 9 hours at 55° C. and 5.5 hours at 75° C., the oxidation had stopped. The reaction product was fractionated under reduced pressure to isolate the 3-methylglutaric acid-anhydride fraction which distilled in the range of 153° C./14 mm., to 210° C./20 mm. This mixture by analysis was 31.0 percent anhydride and 59.6 percent acid. The yield and efficiency to this distilled fraction was 50 percent.

*Example XVII*

The distilled mixture of 3-methylglutaric acid and anhydride was converted to the pure anhydride by the following procedure. A charge of 576 grams of the mixture (contained 26.9 percent anhydride and 67.5 percent acid) was fractionated on an efficient laboratory still column. The still was fitted with a hot condenser maintained at 110° C. by refluxing toluene. This hot condenser served to condense the 3-methylglutaric anhydride while the water formed passed on to cold traps. The distillation was performed under reduced pressure controlled to maintain a kettle temperature of 239°–252° C. The distillation required 3.5 hours. The main fraction, weighing 414 grams, contained 88.7 percent anhydride and 9.2 percent acid. It was redistilled by the same procedure over a period of 3 hours to isolate 383 grams of colorless, 3-methylglutaric anhydride having these properties; boiling point 210° C. at 190 mm., melting point 47° C., 95.0 percent purity by anhydride analysis, 3.3 percent as 3-methylglutaric acid. This anhydride was produced with 80 percent yield and 90 percent efficiency when credit was taken for materials in mid-fractions and transfer losses.

*Example XVIII*

To a mixture of 299.88 grams (3 mols) of a glutaraldehyde in aqueous solution (25.5 percent) and 1.2 grams of cobalt acetate tetrahydrate maintained at a temperature of 25° C. was added 834 grams of a solution of peracetic acid in acetic acid (54.7 percent of peracetic acid; 6.0 moles). The sulfuric acid content of the peracetic acid solution was one percent, as a stabilizer. The mixture was refluxed for a period of two hours to decompose all of the peracetic acid. The sulfuric acid was then neutralized by the addition of 16.4 grams of sodium acetate and water removed from the reaction mixture by distillation to a head temperature of 113° C. In order to maintain the kettle temperature at a minimum, 300 grams more of acetic acid were added during the step of removing the water by distillation. Thereupon 918 grams of acetic anhydride were added to the reaction mixture and the distillation continued to a head temperature of 130° C. and a kettle temperature of 170° C. Finally the residue was distilled under reduced pressure to obtain 250 grams of glutaric anhydride corresponding to a yield and efficiency of 73 percent, based on the glutaraldehyde.

*Example XIX*

To a mixture of 1394 grams (1.84 mols) of 2-chloroglutaraldehyde in aqueous solution (17.7 percent) was added 5.5 mols of peracetic acid, a fifty percent molar excess, in acetone solution. The acid was added with stirring at a temperature between 25 and 35° C. over a period of about 6 hours, resulting in oxidation of 95 percent of the aldehyde charged. The crude oxidation mixture was then distilled at a maximum temperature of 58° C. at a pressure of 8 mm. of mercury, yielding a colorless crystalline residue which upon analysis was found to contain 80.0 percent 2-chloroglutaric acid by chloride analysis and 96.7 percent 2-chloroglutaric acid by acid analysis, indicating that some 2-hydroxy glutaric acid was present, due to hydrolysis.

Three hundred and thirty-seven grams (1.53 mols) of 2-chloroglutaric acid, of 75.8 percent purity by chlorine analysis, was distilled under reduced pressure with 1194 grams (11.7 mols) of acetic anhydride to yield crude 2-chloroglutaric anhydride of 83 percent purity by chlorine analysis. This crude distillate was crystallized twice from isopropyl ether-acetone mixture to yield colorless 2-chloroglutaric anhydride of 92 percent purity by chlorine analysis.

*Example XX*

To a mixture of 2652 grams (4.2 mols) of aqueous crude 2-bromoglutaraldehyde was added 1900 grams of 20 percent peracetic acid in ethyl acetate (5 mols). The acid was added with stirring at a temperature between 25 and 30° C. over a period of 3.5 hours. The crude oxidation mixture was then distilled at a maximum temperature of 40° C. at a pressure of 6 mm. of mercury, yielding 759 grams of crude 2-bromoglutaric acid as product.

What is claimed is:

1. A process for making a glutaric acid selected from the group consisting of glutaric acid, lower alkyl substituted glutaric acids and halogen substituted glutaric acids, wherein the corresponding glutaraldehyde is oxidized in an aqueous solution having not less than 10 parts nor more than 50 parts of said glutaraldehyde per 100 parts of water and said glutaraldehyde.

2. A process for making glutaric acid wherein glutaraldehyde is oxidized in an aqueous solution having not less than 10 parts nor more than 50 parts of said glutaraldehyde per 100 parts of water and said glutaraldehyde.

3. A process for making a halogen-substituted glutaric acid wherein a halogen-substituted glutaraldehyde is oxidized in an aqueous solution having not less than 10 parts nor more than 50 parts of said glutaraldehyde per 100 parts of water and said glutaraldehyde.

4. A process for making a lower alkyl-substituted glutaric acid wherein a lower alkyl-substituted glutaraldehyde is oxidized in an aqueous solution having not less than 10 parts nor more than 50 parts of said glutaraldehyde per 100 parts of water and said glutaraldehyde.

5. A process for making a glutaric acid selected from the group consisting of glutaric acid, lower alkyl substituted glutaric acids and halogen substituted glutaric acids wherein the corresponding glutaraldehyde in aqueous solution is oxidized with an oxidizing agent in the presence of an oxidation catalyst, said aqueous solution having not less than 10 parts nor more than 50 parts of said glutaraldehyde per 100 parts of water and said glutaraldehyde.

6. A process for making a glutaric acid selected from the group consisting of glutaric acid, lower alkyl substituted glutaric acids and halogen substituted glutaric acids wherein the corresponding glutaraldehyde in aqueous solution is oxidized with an oxidizing agent in the presence of an oxidation promotor said aqueous solution having not less than 10 parts nor more than 50 parts of said glutaraldehyde per 100 parts of water and said glutaraldehyde.

7. A process for making a glutaric acid selected from the group consisting of glutaric acid, lower alkyl substituted glutaric acids and halogen substituted glutaric acids, wherein the corresponding glutaraldehyde in aqueous solution is oxidized with molecular oxygen in the presence of a promotor selected from the group consisting of acetaldehyde, propionaldehyde, glutaric acid, and the oxidation product of said process, said aqueous solution having not less than 10 parts nor more than 50 parts of said glutaraldehyde per 100 parts of water and said glutaraldehyde.

8. A process for making a glutaric acid selected from the group consisting of glutaric acid, lower alkyl substituted glutaric acids and halogen substituted glutaric acids, wherein the corresponding glutaraldehyde in aqueous solution is oxidized with a compound selected from the group consisting of hydrogen peroxide, peracetic acid and perpropionic acid, said solution having not less than 10 parts nor more than 50 parts of said glutaraldehyde per 100 parts of water and said glutaraldehyde.

9. A process for making glutaric acid which comprises introducing molecular oxygen into an aqueous solution of glutaraldehyde in the presence of from 0.10 to 2.0 parts of a water-soluble salt of cobalt per 100 parts of solution, and in the presence of glutaric acid, said aqueous solution having not less than 10 nor more than 50 parts of said glutaraldehyde per 100 parts of water and said glutaraldehyde.

10. A process for making 3-methylglutaric acid which comprises introducing molecular oxygen into an aqueous solution of 3-methylglutaraldehyde in the presence of a cobalt catalyst and in the presence of acetaldehyde, said aqueous solution having not less than 10 parts nor more than 50 parts of said glutaraldehyde per 100 parts of water and said glutaraldehyde.

11. A process for making 2-ethylglutaric acid which comprises introducing molecular oxygen into an aqueous solution of 2-ethylglutaraldehyde in the presence of a cobalt catalyst and in the presence of propionaldehyde, said aqueous solution having not less than 10 parts nor more than 50 parts of said glutaraldehyde per 100 parts of water and said glutaraldehyde.

12. A process for making 2-chloroglutaric acid which comprises introducing peracetic acid into an aqueous solution of 2-chloroglutaraldehyde, said aqueous solution having not less than 10 parts nor more than 50 parts of said glutaraldehyde per 100 parts of water and said glutaraldehyde.

13. In a process according to claim 1 the further improvement which comprises removing the water from the reaction product mixture and reacting the glutaric acid with a lower carboxylic acid anhydride to convert it to a glutaric anhydride; distilling said glutaric anhydride; and thereafter reacting said glutaric anhydride with water to reconvert it to a glutaric acid.

14. In a process according to claim 13 the further improvement which comprises removing the water from the reaction product mixture, concentrating out the tars and catalyst in a non-volatile residue by volatilization without fractionation, heating the distillate to thermally convert said glutaric acid to a glutaric anhydride, removing said anhydride and the water from the reaction as formed, and condensing said anhydride as liquid product at a temperature above the condensation temperature of water.

15. In a process according to claim 13 the further improvement which comprises employing a cobalt catalyst and recovering said cobalt catalyst from the oxidation product by dissolving the tarry catalyst-containing residue in a boiling acid, mixing the resultant solution with water and ethyl acetate, separating the water layer thus formed and extracting said water layer with ethyl acetate to leave said cobalt catalyst in said water layer in the form of cobalt acetate tetrahydrate.

References Cited in the file of this patent

UNITED STATES PATENTS 2,389,950      Bremner et al.            Nov. 27, 1945